F. HECK.
APPARATUS FOR MAKING MULTIPLE BEADINGS ON PIPES.
APPLICATION FILED SEPT. 22, 1915.
1,399,383.
Patented Dec. 6, 1921.
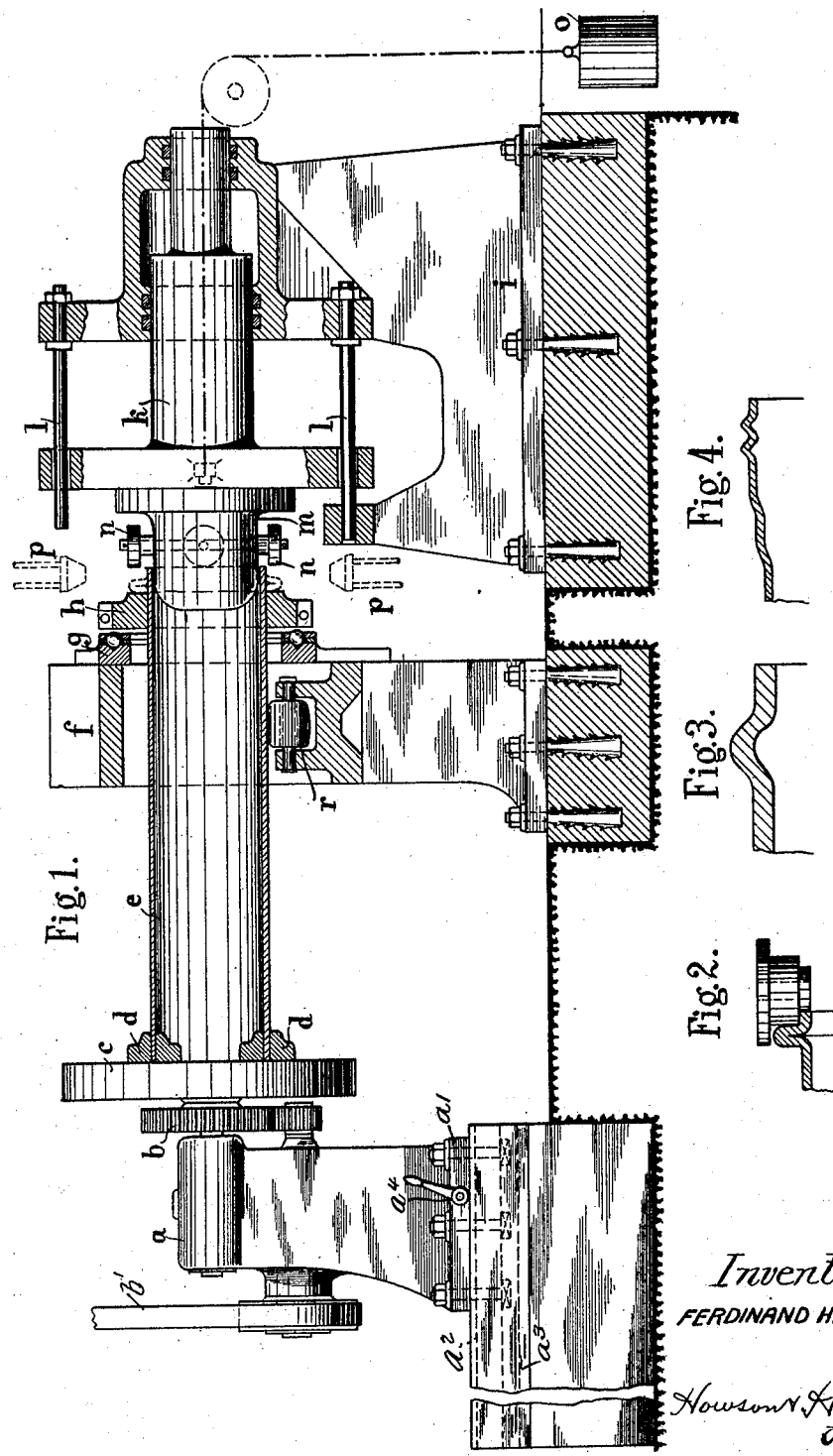
Inventor.
FERDINAND HECK
Howson & Howson
attys.

UNITED STATES PATENT OFFICE.

FERDINAND HECK, OF DUSSELDORF-RATH, GERMANY.

APPARATUS FOR MAKING MULTIPLE BEADINGS ON PIPES.

1,399,383.  Specification of Letters Patent.  Patented Dec. 6, 1921.

Application filed September 22, 1915. Serial No. 52,132.

(GRANTED UNDER THE PROVISIONS OF THE ACT OF MARCH 3, 1921, 41 STAT. L., 1313.)

*To all whom it may concern:*

Be it known that I, FERDINAND HECK, a subject of the King of Prussia, residing at 9 Reichswald-Allee, Dusseldorf-Rath, Prussia, Germany, have invented certain new and useful Improvements in Apparatus for Making Multiple Beadings on Pipes; and I do hereby declare the following to be a full, clear, and exact description of my invention, such as will enable others skilled in the art to which it appertains to make and use the the same, reference being had to the accompanying drawings, and to letters or figures of reference marked thereon, which form a part of this specification.

My invention relates to apparatus for making multiple beadings on pipes.

Up to now the producing of beadings on pipes and particularly multiple beadings has been carried out by an upsetting process in such a way, that an axial pressure is exerted upon the immovable pipe. For this process suitable pressing tools, consisting of dies are used. During this process the material of the pipe is subjected to great stresses, and cracks in the material easily occur as well as an unequal distribution of material, which requires a good deal of supplementary work. Besides, the power required for this process is very considerable, particularly with pipes of large diameters.

My invention has for its object to replace the axial upsetting pressure by which the pipe is formed between suitably profiled dies by a rolling process, during which double or multiple beadings are formed by pressing profiled rollers against the end of the pipe, this pipe being kept in constant rotation.

In this beading-process the material of the pipe is considerably spared, and the translocations of material are much slower and uniform. By means of the profiled rollers the beadings also obtain at once the proper shape, thus saving supplementary work on lathes and cutting away unequal beading edges. Besides this process requires less power than the prior process.

In the accompanying drawing,

Figure 1 is a side elevation, partially in section through a machine for carrying out my new process;

Fig. 2 is an elevation of a modified form of profile roll; and

Figs. 3 and 4 are partial sections through pipe ends to which different preparatory forms have been given.

The standard $a$ is mounted on a slide $a^1$ longitudinally displaceable in a guideway $a^2$ in the base $a^3$. The disk $c$ is carried by a shaft journaled in the standard $a$ and driven from belt $b^1$ through gearing $b$. On the disk $c$ are clutches $d$ for gripping one end of the pipe $e$. A further support $f$ with rollers $r$ is provided for supporting the forward end of the pipe.

On the support $f$ is further provided a roller-bearing $g$, serving for taking up the axial pressure or as an abutment to shackles $h$ made of several parts and clamped to the pipe-end. Said shackles are movable on the pipe so that the beading height may be easily altered; when doing so the support $a$ is moved more or less toward the tool, so that the necessary length of the pipe-end projects beyond the shackles.

Opposite the free pipe-end is a support $i$ on which rests a hydraulic cylinder with a plunger $k$ guided by rods $l$. Fixed to the front end of the plunger $k$ is a core mandrel $m$, the outside diameter of which corresponds to the inside diameter of the pipe under operation. On the circumference of said core are rotatable profiled rollers $n$; in the example shown I have indicated four rollers, but the number of these rollers may be varied.

$o$ are counterweights for withdrawing the plunger $k$. Near the end of the pipe under operation are provided centrally displaceable watergas burners $p$.

The rolling process is carried on as follows:

After having passed the pipe $e$ through the opening in the support $f$ and fastened it in the clutches $d$, the support $a$ is fastened in any suitable way—as by means of a cam clamp $a^4$. The shackles $h$ are then placed on the end of the pipe and the part of this pipe projecting beyond these shackles is heated. The plunger $k$ is then pressed forward so that the rollers $n$ contact with the end of the pipe. The disk $c$ with the pipe $e$ is now set into rotation and the plunger $k$ is kept under constant pressure.

The end of the pipe projecting beyond the shackles then begins to bow outward and to finally adopt the shape of the double beading shown in dotted lines, which is pressed and properly profiled by the rollers *n*.

When the rolling process is terminated the presure exerted upon the plunger *k* is relieved and the plunger is withdrawn by the counterweights *o*. The shackles *h* are then removed from the pipe and the support *a* is pushed back, so that the pipe can be removed from the disk *c*.

In place of the hydraulic plunger *k* any other device *e. g.* a screw press could be used for pushing forward the core *m* with the profiled rollers *n*. The core and the rollers could also be fixed and the pipe with its gear be given an axial movement toward the rollers.

In order to limit the external diameter of the beading, the rollers *n* may also project beyond this beading as shown in Fig. 2.

This process may also be applied when the ends of the pipe are subjected to a preliminary forming process, as shown in Fig. 3, which is to be recommended for greater thicknesses of pipes.

Bell end pipes to which a preliminary profile has been given, as Fig. 4 shows, may be provided at their end with one or several double beadings.

While I prefer to use for my process the construction shown, as being well adapted for the purpose of my invention, it is evident that the details may be modified without departing from the spirit of the invention.

I claim as my invention:

1. In apparatus for forming pipe flanges, means for supporting and rotating a pipe, a mandrel having a diameter substantially corresponding to the internal diameter of the pipe and longitudinally displaceable with relation to the pipe, rolls carried by said mandrel beyond the end of the pipe and bearing against the pipe end substantially at right angles to the axis of the pipe, abutment means surrounding the pipe, and means for forcing said mandrel against the pipe end during its rotation to buckle the latter between said rolls and abutment to form a double-walled flange therein, substantially as described.

2. In a construction such as recited in claim 1, rolls on the mandrel profiled to insure the formation of said flange in the pipe wall at a point spaced inward from the pipe end.

3. In a construction such as recited in claim 1, abutment elements surrounding the pipe comprising a fixed standard pierced to accommodate the pipe and having an anti-friction bearing on one face thereof, together with a clamp abutment adjustable on the pipe and bearing, under the pressure of the mandrel, against the anti-friction member on the abutment standard.

4. Apparatus for forming pipe flanges, comprising a longitudinally slidable standard, means thereon for supporting and rotating a pipe at one end thereof, a coöperating standard freely supporting the opposite end of the pipe, an abutment ring adjustable on the pipe and having a bearing against said standard, a mandrel entering the pipe end and profile rollers carried thereby and bearing under axial pressure against the pipe end to buckle the wall of the latter and form the buckled portion into a flange.

In testimony whereof I have signed my name to this specification, in the presence of two subscribing witnesses.

FERDINAND HECK. [L. S.]

Witnesses:
C. KATHAGEN,
ALBERT NUFER.